Figure 1:
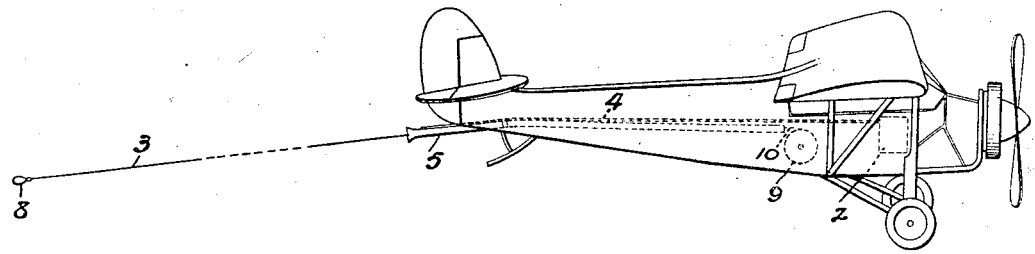

Aug. 7, 1934.   E. F. W. ALEXANDERSON   1,969,537
METHOD AND MEANS FOR DETERMINING ALTITUDE FROM AIRCRAFT
Filed Nov. 17, 1928    2 Sheets-Sheet 1

Inventor:
Ernst F. W. Alexanderson
by Charles E. Tullar
His Attorney

Aug. 7, 1934. E. F. W. ALEXANDERSON 1,969,537
METHOD AND MEANS FOR DETERMINING ALTITUDE FROM AIRCRAFT
Filed Nov. 17, 1928 2 Sheets-Sheet 2
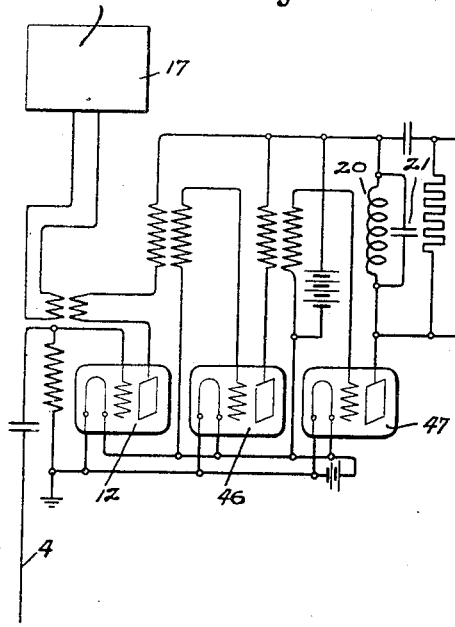
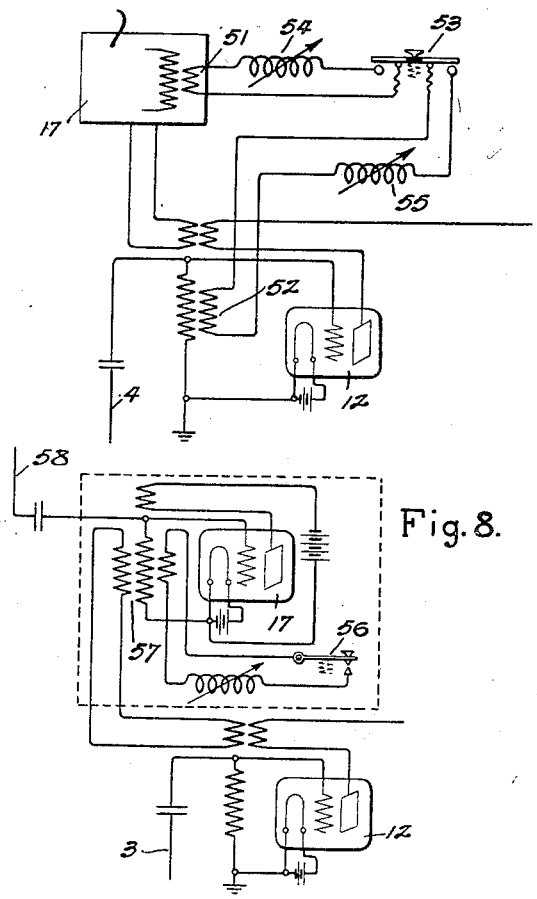
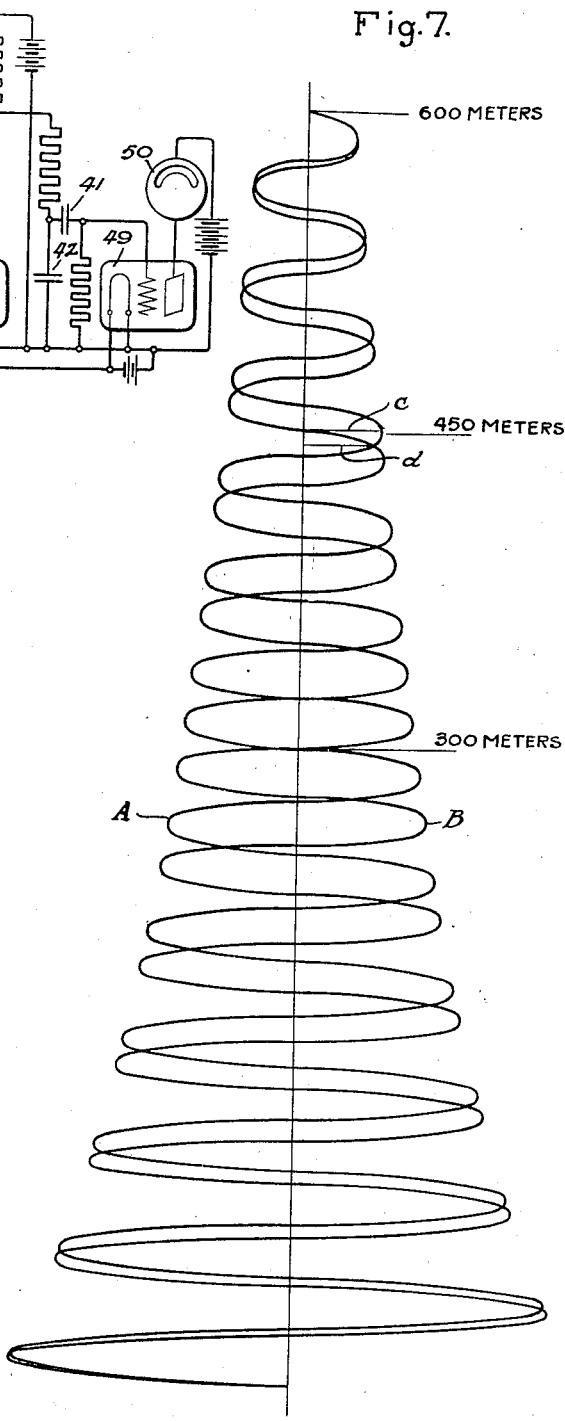
Inventor:
Ernst F. W. Alexanderson,
by Charles E. Tullar
His Attorney.

Patented Aug. 7, 1934

1,969,537

UNITED STATES PATENT OFFICE 1,969,537

METHOD AND MEANS FOR DETERMINING ALTITUDE FROM AIRCRAFT

Ernst F. W. Alexanderson, Schenectady, N. Y., assignor to General Electric Company, a corporation of New York Application November 17, 1928, Serial No. 319,989

12 Claims. (Cl. 250—1)

My invention relates to a method and means for determining the altitude of aircraft above the earth and it has for one of its objects to provide a method and means involving the use of radiated high frequency energy whereby reliable indications of altitude may be had upon the craft.

It has been proposed by the workers of the prior art to mount upon an aircraft a high frequency oscillation generator including as a part of the oscillatory circuit thereof an antenna of suitable form so arranged that the natural frequency of oscillation of the oscillatory circuit is effected by the change in capacity between the antenna and ground, or the changes in capacity between different portions of the antenna, as between metallic plates mounted on the wings of the plane. It has been proposed to utilize this change in frequency as an indication of the altitude of the plane above the earth.

In experimenting with arrangements of the type indicated I have found that so long as experiments were predicated upon the theory that change in capacity is the principal factor in determining the frequency reliable indications of the altitude of the craft could be had only at altitudes which are small compared with the wavelength employed. At higher altitudes observations made were so conflicting as not to constitute an indication of the altitude at all.

During the course of these experiments I have discovered that the change in the capacity of the antenna is not the determining factor of the frequency which is produced but rather that this change in frequency is due to the effect of radiated waves which are reflected from the earth back to the radiating antenna and there combined with the waves which are then excited in the antenna to vary the frequency thereof. For example, if the reflected wave is shifted in phase with respect to the wave excited in the antenna a frequency change will occur. That is, either an increase or decrease in frequency will occur dependently upon whether the reflected wave is in advanced or retarded phase relation with respect to the emitted wave. The magnitude of the frequency change is of course dependent upon the degree of shift in phase of the two waves and upon the relative magnitude of the emitted and reflected waves.

Since the phase relation between the wave emitted by the antenna and the reflected wave which arrives back at the antenna is dependent upon the distance of the plane from the earth, it will be understood that the frequency produced is dependent upon this altitude, but that since the phase relation between the emitted and reflected waves at the antenna reverses at regular intervals of altitude as the plane ascends or descends, frequency alone will not indicate the altitude of the plane.

That is, for example, if we assume that the plane is at a particular altitude and an ascent is made the frequency will be found to increase over a change in altitude of one-half of a wave length of the wave at which the antenna has been normally adjusted to oscillate. At this increased altitude the frequency will start to decrease and will continue to decrease until a further ascent of a half wave length is made at which time it will again increase. It has been experimentally found that these alternate increases and decreases in frequency occur in the ascent or descent of the craft in regular cycles at every change in altitude amounting to a wave length of the wave having the frequency at which the antenna is normally adjusted to oscillate.

It will be apparent from the above remarks that the absolute value of the frequency at any particular point in the course of the aircraft except at altitudes which are small as compared with the wave length does not constitute an indication of the altitude since oscillations of the same frequency may occur at other altitudes. It has been found that the amplitude of the cyclic variation in frequency, however, is dependent upon the altitude and that this amplitude varies in the nature of an inverse proportionality with respect to the altitude. At the lower altitudes the amplitude of the cyclic variation in frequency may be very great whereas as the altitude increases the amplitude gradually decreases. This, of course, follows from the fact that the magnitude of the reflected wave which arrives back at the plane diminishes as the altitude increases. Thus the amplitude of the cyclic variation constitutes a definite indication of the altitude. The accuracy of this indication is of course greater at the lower altitudes, since at these altitudes the amplitudes of the cyclic variations and the changes in this amplitude with respect to altitude, are greater.

The theory underlying the change in frequency of the oscillations produced on the antenna may be more fully explained as follows: Ordinarily we assume that the frequency of an electrical oscillator is determined by the inductance and capacity of the circuit just as the period of a mechanical oscillator is determined by the inertia of the vibrating body and the amount of the restoring force. When the only restoring forces which are present in the system are the inherent forces the oscillator will oscillate at the natural period. If additional periodic forces from the outside are introduced into the system, as by impressing the reflected wave upon the antenna oscillator, for example, these forces may add to or subtract from the inherent restoring forces of the oscillatory circuit dependently upon the phase relation existing between the applied forces and the inherent forces. Thus, if the force coming from outside is in phase with the inherent restoring force, the system will oscillate at a higher frequency, and conversely, if the force from outside is in opposition to the inherent force the system will oscillate at a lower frequency.

Thus if the phase relation existing between the natural oscillations of the antenna carried by an aircraft and those which are reflected from the earth vary cyclically as is the case when the craft changes in altitude it follows that the frequency will likewise vary cyclically. The amplitude of the cyclical variation will, of course, be dependent upon the intensity of the reflected wave which reaches the oscillating system.

One is tempted, from well known considerations of oscillating circuits, to draw the conclusion that the addition of outside forces to the inherent forces of the oscillating system merely change the phase, and not the frequency, of the oscillations produced. I have discovered, however, that the frequency of an antenna oscillator does vary as described and I have experimentally proved the cyclic nature of these variations.

Thus two methods of determining the altitude of the craft are provided in accordance with my invention as thus far disclosed; the first including the use of the amplitude of the cyclic variation as the criterion, and the second, that of counting the number of cyclic variations which occur in the course of the flight from a point of known altitude to the point the altitude of which is to be determined.

Still further methods comprising my invention and means whereby these methods may be practiced on aircraft will be described hereinafter.

Figure 2:
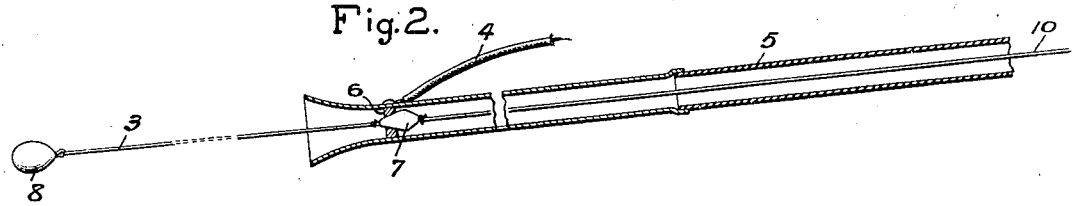
Figure 3:
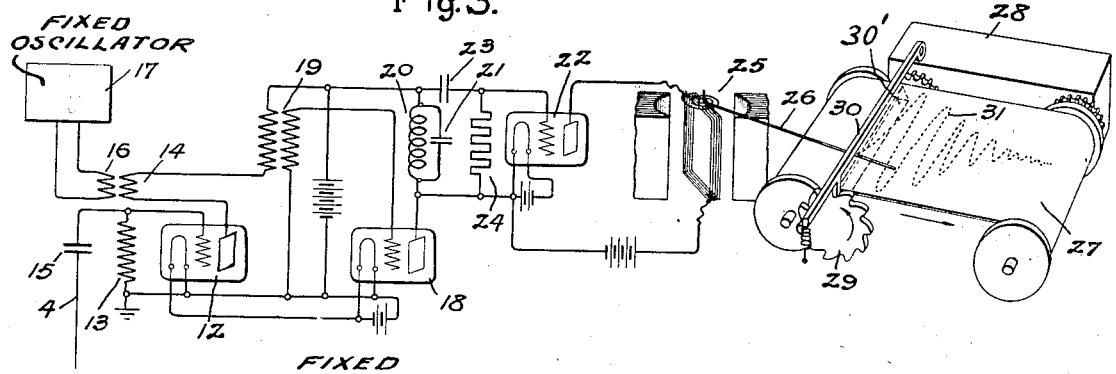
Figure 4:
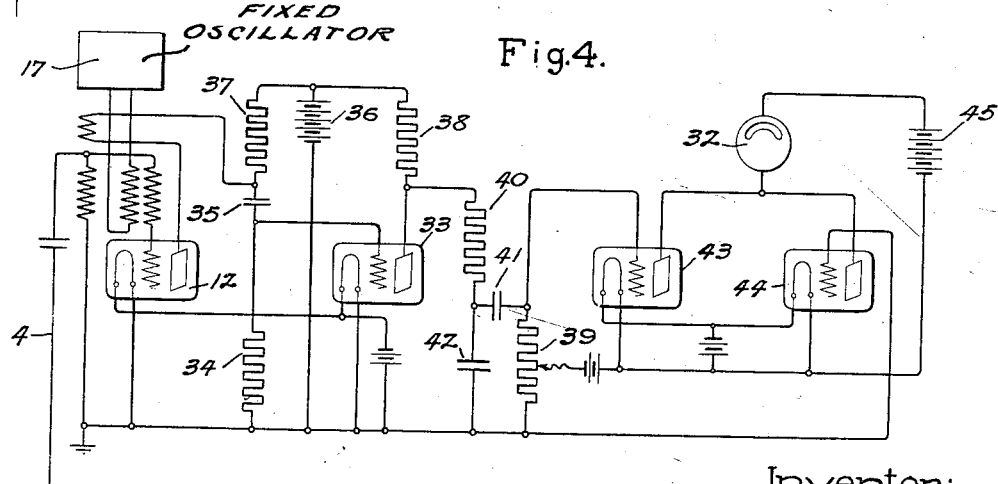

The novel features which I believe to be characteristic of my invention are set forth with particularity in the appended claims. My invention itself, however, may best be understood by reference to the following description taken in connection with the accompanying drawings in which Fig. 1 represents an aircraft equipped with means whereby my invention may be practiced; Fig. 2 represents a detail; Figs. 3, 4 and 5 represent circuit arrangements which may be employed; Fig. 6 represents a modification, Fig. 7 represents, for illustrative purposes, characteristics indicative of the operation of the modification shown in Fig. 6, and Fig. 8 represents a further modification of the arrangement shown in Fig. 5.

Referring to the drawings Fig. 1 indicates an aircraft carrying radio equipment 2 including an antenna 3 which I utilize in connection with my invention. The equipment 2 is preferably mounted upon the craft in a position such that it may be readily adjusted and observed by the operator. This equipment is connected with the antenna 3 by means of a suitable connection 4. The antenna 3 has a length preferably of about one quarter of a wave length of the wave having the frequency at which the equipment 2 is adjusted to operate. It is carried preferably at the rear of the craft in position such that capacity changes between the antenna and the craft are small. For the purpose of conveniently controlling the antenna means are provided which are illustrated in greater detail in Fig. 2. This means comprises a hollow non-conducting tubing 5 which projects from the operator's cabin through the fuselage at the rear of the craft. Within the tubing near the rear of the craft is mounted a conducting collar 6 having an opening through which the antenna passes.

At the inner end of the antenna is attached a conducting member 7, the outer dimensions of which are greater than the inner dimensions of the collar 6, but are such that the member may be moved freely back and forth through the tubing 5. When the antenna is in the position shown in the drawings the collar 6 and the member 7 form a conductive connection between the connection 4 and the antenna 3. The antenna is provided at its outer end with a weight 8 such that normally when the antenna is in use this weight causes the member 7 to bear against the member 6 to make a good electrical connection. A reel 9 is provided within reach of the operator by means of which the antenna 8 may be raised or lowered. A suitable non-conducting cord 10, which is attached to the member 7 and which extends through the tubing 5 to the reel 9, serves to raise and lower the antenna 3 as the reel is operated by the operator. When the antenna is hauled in by the reel the weight 8 will remain in the bell-shaped portion of the tube 5, or be suspended therefrom, since, because of its dimensions it cannot pass through the opening in the collar 6. Thus, when the antenna is let out the weight 8 will carry it into its outer position. If desired, only a portion of the wire 3 may be utilized as the radiating antenna, connection being made between the conductor 4 and collar 6 directly with the antenna conductor 3. In this way the antenna is maintained free from any large conducting masses having large capacity such, for example, as the reel 9. This reel may be grounded to the plane.

In Fig. 3 I have shown one circuit arrangement which may be employed in carrying my invention into effect. This arrangement comprises an oscillating detector which includes an electron discharge device 12 having a grid inductance 13 which is inductively coupled with an inductance 14 in the anode circuit of the discharge device. One side of the inductance 13 is connected to the cathode of the electron discharge device and to the frame of the plane. The other side of this inductance is connected through a condenser 15 to the antenna and to the grid of the discharge device. The adjustments are such that the circuit including the inductance 13, condenser 15 and the antenna is resonant at a predetermined normal value corresponding to the normal wave length to be employed.

It will be understood from the explanation already presented that as the altitude of the aircraft changes the frequency of oscillations produced in the oscillatory circuit and on the antenna will vary cyclically about the normal frequency of the system as determined by the constants of the oscillatory circuit.

From inspection of the drawings it will be seen that the oscillatory circuit of the oscillator 12 includes the inductance 13, the capacity 15, the conductor 4 and the antenna 3 (shown in Fig. 1) to which it is connected, and the natural capacity between the antenna and the craft. The capacity 15 is so adjusted that it about equals the capacity between the antenna and craft such that a nodal point of the wave excited in the antenna will occur at the end of the antenna which is nearer the craft. In this way this portion of the circuit is maintained at little or no alternating potential with respect to the craft and the effect of capacitance variations between the antenna and the craft upon the frequency of oscillations produced is greatly reduced.

Coupled to the circuit of the oscillating detector 12 in any suitable manner as by means of a coil 16, which is in inductive relation with the coils 13 and 14, is an oscillation generator 17. This generator is of any suitable construction and is adjusted to produce oscillations which differ by a small percentage from the frequency of the oscillations produced by the device 12. Thus in the anode circuit of the electron discharge device 12 will be produced oscillations having the beat, or difference, frequency between the oscillations produced by the generators 12 and 17. These oscillations of beat frequency will of course vary in frequency as the frequency of the device 12 varies when the craft changes in altitude.

Oscillations of this beat frequency are supplied to the grid of an amplifier 18 through a suitable inductive coupling 19. In the anode circuit of the discharge device 18 is connected an inductance 20. This inductance has a natural period of oscillation, by virtue of its inherent capacity, which is represented in the drawings by the condenser 21, and which is somewhat outside of the range of variation of the beat frequency, that is, the entire range of variation in the beat frequency is included in a portion of one side of the peak of the resonance curve of the inductance 20. Thus the magnitude of the alternating potential which appears upon inductance 20 varies substantially proportionally to the frequency which is supplied to this inductance. Of course, the inductance 20 may be replaced by an equivalent resonant circuit. The alternating potential on the inductance 20 is, in turn, supplied to the grid of an electron discharge device 22 which is provided with the usual grid leak and condenser combination 23, 24 such that it operates as a detector, or rectifier, of the high frequency potential. In the output circuit of this device is connected a suitable indicating or recording device 25, 26, 27 which includes the current responsive device 25 having a pointer 26 which moves back and forth over a chart 27 in accordance with the magnitude of the current appearing in the anode circuit of the discharge device 22 and, hence, in accordance with the frequency of the oscillation generator 12. The recording chart 27, which comprises a thickness of suitable tissue and carbon paper, is arranged to be continuously moved in the direction of the arrow by any suitable means such as a clock mechanism 28, which is also arranged to drive in a counterclockwise direction a notched-wheel 29. Extending across the chart 27 and above the pointer 26 is a member 30 which is caused to oscillate vertically in accordance with the notches in the wheel 29. This member is so positioned that when in its upper position the pointer 26 is free to move in either direction depending upon the magnitude of the current in the discharge device 22. In the lower position of the member 30 the pointer 26 is caused to bear downward upon the chart 27 and to press the chart between the needle and a triangular shaped member 30' beneath the chart thereby to cause a mark to be produced upon the chart in a position dependent upon the position of the pointer. In this way a curve 31 is drawn upon the chart 27 which is indicative of the frequency of the oscillation generator 12, and which may be used to determine the altitude of the plane. This curve comprises a series of dots spaced apart dependently upon the speed at which the wheel 29 is driven.

It will be seen that the curve 31 varies cyclically about a normal value which corresponds to the normal frequency at which the circuit comprising condenser 15 and inductance 13 is adjusted to oscillate and the magnitude of these cyclic variations, which is dependent upon the magnitude of the reflected wave and upon the phase shift between the emitted and reflected wave, increases as the craft approaches the earth. Thus the curve 31, as shown in the drawings, indicates that the craft has descended from a high altitude into proximity with the earth. At any time during the course of flight the operator may observe the amplitude of the cyclic variation and thereby determine the altitude of the craft.

In Fig. 4 I have shown means whereby a more direct indication of the altitude may be had by means of a meter 32 which is arranged to follow the envelope of the curve 31. The circuit of the oscillation generators 12 and 17 are substantially the same as has been represented in Fig. 3 and therefore will not be further described. Beat frequency oscillations which appear in the circuit of the oscillator 12 are supplied to the grid of an electron discharge device 33, having a grid leak resistance 34 and grid condenser 35. The anode circuit of each of the discharge devices 12 and 33 are supplied with potential from a source 36 through resistances 37 and 38 respectively. Between the anode and cathode of device 33 are connected resistance 40 and condenser 42 through which will pass current impulses having frequency dependent upon the beat frequency of the current supplied to this device. Accordingly the potential on condenser 42 will vary with this frequency. This potential is supplied to a resistance 39 through condenser 41, this condenser together with condenser 42 comprising a filter the purpose of which will later be indicated. The opposite terminals of the resistance 39 are connected respectively to the grids of a pair of electron discharge devices 43 and 44, the filaments of which are connected to the mid-point of the resistance 39. The anode circuit of these devices are connected together and to a source of potential 45 through a direct current responsive indicating device 32.

In the operation of this arrangement it will of course be understood that the current in each of the discharge devices 43 and 44 will vary with the frequency of the oscillator 12, that is, the direct current flowing in the anode circuit of each of devices 43 and 44 will follow a curve similar to that shown at 31 in Fig. 3 as the craft changes in altitude. Due, however, to the fact that the potentials which are applied to the grid of the two devices are in opposed phase relation, the current in one device will tend to increase as that in the other decreases with the result that the anode current of the two devices will be displaced in phase by one hundred and eighty degrees and therefore the frequency of pulsations in device 32 will be doubled. The needle of the device 32 may then be made sufficiently sluggish to follow the envelope of one side of the curve 31 as the craft changes altitude at greater than a predetermined rate and will thereby be made to indicate directly the altitude of the craft above the earth.

It may occur during the operation of the arrangement such as thus described that the normal frequency of one, or the other, or both, of the oscillation generators will vary during the course of a flight as, for example, due to variations in the anode potential of the discharge devices employed. Variations of this nature will of course cause a shift in the beat frequency of the oscillation generator. The potential on condenser 42 will of course vary with this beat frequency and this in turn is likely to cause the needle of the device 32 to deflect with reference to a point other than the center of the scale. Thus, if the meter is a recording meter such as that shown in Fig. 3, the axis of the curve 31 will be shifted to one side or the other of the center of the chart and the needle of the meter may oscillate off-scale. To obviate this difficulty the filter 41, 42 is provided. The condenser 41 is of a capacity such that it passes all frequencies greater than some low value, for example, 1/30th of a cycle per second. The condenser 42 is of somewhat smaller value and is adapted to by-pass all frequencies greater than, for example, 1 cycle per second. In this way the gradual shift in potential upon condenser 42 which occur, due to a gradual drift of the beat frequency, is prevented from affecting the grids of the devices 43 and 44 and only frequencies of the order of magnitude of the frequency of the cyclic variations which occur in the normal frequency of the device 12 when the altitude is changed at rates which are commonly employed, will effect the grids of devices 43 and 44. Accordingly, the deflection of the meter 32 may always be determined with reference to a particular point, such as the zero point, upon the scale of the meter.

In Fig. 5 I have shown a further embodiment of my invention in which the oscillations of beat frequency from the oscillating detector 12 are amplified in two stages of amplification represented in the figure by cascade connected electron discharge devices 46 and 47. In the anode circuit of the amplifier 47 is connected the inductance 20 having internal capacity 21 which gives the unit a natural period of the order mentioned in connection with Fig. 3. Potential from this reactance is supplied to the grid leak detector 48 in the anode circuit of which appear current pulsations which are variable dependently upon the magnitude of the potential on the reactance 20. Potential is supplied from the anode of this discharge device to the grid of a discharge device 49 in the same manner as was described in connection with Fig. 4. The filter 41, 42 is included in the circuit between the anode of device 48 and the grid of device 49 to prevent changes in the average value of the alternating potential which appears upon reactance 20 due to any gradual drift in the beat frequency from affecting the grid of device 49. The needle of the meter 50 then oscillates with reference to a zero point which remains substantially the same throughout the flight. By use of the means shown in this figure curves have been taken during a flight clearly showing the cyclic variations and the variation in the amplitude of the cyclic variations which in turn clearly indicate the altitude of the plane.

In Fig. 6 I have shown a modification of my invention whereby oscillations of different normal frequency may be transmitted from the aircraft, and the effect of the reflected wave from these oscillations compared to determine the altitude of the plane. Thus, for example, referring to Fig. 6 a few turns of coil 51 and 52 which are in inductive relation with the inductances of the oscillatory circuits of the oscillation generators 17 and 12 respectively, are arranged to be short circuited by means of a key 53. The degree of short circuiting of each of these groups of turns may be controlled by means of adjustable inductance 54 and 55. Adjustments will be made such that when the key is open a certain beat frequency will normally be produced in the output circuit of the oscillating detector 12. When the key is closed the degree of short circuiting of each of these turns will be so adjusted that the same beat frequency will be produced in the output circuit of the oscillating detector although the normal frequency of the generator 12 will be changed.

The operation of this modification of my invention may best be understood by reference to Fig. 7. If we assume that the normal frequency of the oscillation generator is, for example, 100 meters and that the craft has ascended to an altitude of 600 meters, it will be seen that the needle of the indicating meter will have oscillated through 12 complete cycles; that is, the reflected wave which has traversed the distance from the plane to the earth has passed through 12 wave lengths, six in going down and six in coming back. The resulting curve of the indicating instrument, if a recording instrument be employed, may be represented as at A in Fig. 7. Let us assume now that the normal frequency of the oscillation generator 12 is increased such that the meter will have traced 13 complete cycles in ascending to an altitude of 600 meters. This curve traced by the meter may be represented by B in Fig. 7. At an altitude of 300 meters the curve A which represents the operation of the meter when the key 53 is open will have passed through six complete cycles and the curve B which represents the operation of the meter when the shorter wave length is employed will have passed through six and one half complete cycles. Thus, if we assume that the two waves are in phase at 600 meters they will be 180° out of phase at 300 meters, and at 900 meters and in phase at 1200 meters. In determining these characteristic points let us suppose that the operator observes that the meter 50 is at the midpoint of the scale. If he presses the key and no deflection occurs, it will indicate that he is at one of these points since at every other point with the meter at the center of the scale, if the key is pressed, a deflection will occur. Let us assume that the operator is at an altitude of 300 meters when he presses the key and finds that no deflection occurs, he will then change his altitude by a distance of a quarter of a wave length during which time the meter will have traced curve A to a maximum value. If he then presses the key the meter will be deflected from the maximum of the A curve to a maximum of the B curve. This will inform the operator that he is at either the 300 meter altitude or the 900 meter altitude, since if the same procedure is followed at the 600 meter altitude and the 1200 meter altitude the deflection which will be had upon pressing the key after the altitude has been changed by a quarter of a wave length will be very small. The 300 meter altitude may be readily distinguished from the 900 meter altitude by the deflection of the instrument. In this way four characteristic altitudes may be definitely determined. The intermediate points between these basic altitudes for example the 450 meter altitude may be determined either by counting the number of cyclic variations which occur as the altitude is varied from one of these basic altitudes or by observing the deflection of the instrument which occurs when the key is pressed as the needle passes through the zero point. For example at the 450 meter altitude if the key is pressed the meter will deflect as indicated at c in Fig. 7. If the altitude is lowered a permanent deflection will be found equal to that indicated at "d" in the drawings. These indications which are intermediate the deflections had at the three hundred and six hundred meter altitudes clearly distinguish this altitude from those. Similarly it will be seen that similar observations indicating the altitude may be made at regular recurring altitudes one-half wave length apart. These indications have the advantage that they depend primarily upon the difference in character of the two waves rather than on the amplitude of either wave.

Of course, if it is desired to determine other basic points in the altitude the frequency of the oscillator 12 may be adjusted to oscillate at two additional frequencies which are different from the frequencies of the waves producing curves A and B in which case similar curves may be had by means of which different basic altitudes may be determined.

It has been seen from the explanation given in connection with Fig. 7 that the altitude of the craft is determined primarily by the difference in character of the two waves. A still further modification of my invention, whereby the altitude may be determined independently of the amplitude of the waves produced by the recording instrument is shown in Fig. 8. In this case the oscillation generator 17 is the same type as generator 12 each generator employing a separate antenna, 58 and 3 in Fig. 8, which is arranged to oscillate at its natural wave length in the manner described in connection with the generator 12 of Fig. 3. The remaining equipment may be as shown in Fig 5. One of these oscillators will operate normally at a frequency which differs from that of the other by a small percentage and the frequencies of both antennae will vary cyclically in the manner previously described. The indicating device 50 will then indicate the beat frequency between the two variable waves. Let us assume, for example, that the generator 17 is normally adjusted to oscillate at a frequency D and the generator 12 is normally adjusted to operate at a frequency E. It will be found that the beat frequency which will be indicated by the meter 50 will be maxima certain characteristic altitudes and a minima at other characteristic altitudes. If we now change the frequency of the oscillator 17, as by means of a key 56 which is arranged to short circuit a few turns on the grid inductance 57, to the frequency F, for example, it will be found that the beat frequency will have maxima and minima at different altitudes which may be referred to as characteristic altitudes. In the same way other combinations of frequencies may be employed to determine additional characteristic altitudes. Intermediate altitudes may then be determined by the frequency of the beat which is produced.

While I have shown and described particular methods and means whereby my invention may be carried into effect it will of course be understood that I do not wish to be limited thereto since many modifications may be made without departing from the spirit and scope of my invention as I intend to cover it by the appended claims.

What I claim as new and desire to secure by Letters Patent of the United States, is:

1. The method of determining the change in altitude between points in the course of an aircraft which includes transmitting a radio frequency wave from the craft, causing the frequency of said wave to vary cyclically dependently upon the phase relation existing between waves transmitted from the craft and waves which are reflected from the earth to the craft and counting the number of cyclic variations which occur between said points.

2. The method of determining the altitude of an aircraft above the earth which includes transmitting a radio wave having a normal frequency from the craft, causing the frequency of said wave to vary cyclically with respect to said normal frequency dependently upon the phase relation existing between the wave which is transmitted from the craft and the wave which is reflected from the earth to the craft, changing the normal frequency of said wave and comparing the frequency of the transmitted wave before and after the normal frequency is changed.

3. The method of determining the altitude of an aircraft above the earth which includes transmitting from the craft, a radio wave having a normal frequency, causing the frequency of said wave to vary cyclically with respect to said normal frequency dependently upon the phase relation existing between the wave which is transmitted from the craft and the wave which is reflected from the earth to the craft, changing the normal frequency of said wave and finding an altitude at which the frequency produced is the same before and after said change.

4. The method of determining the altitude of an aircraft above the earth which includes transmitting a radio wave, having a normal frequency, from the craft, causing the frequency of said wave to vary cyclically with respect to said normal frequency dependently upon the phase relation existing between the wave which is transmitted from the craft and the wave which is reflected from the earth to the craft, changing the normal frequency of said wave and finding an altitude at which the frequency produced both before and after said change is the normal frequency prior to said change.

5. The method of determining the altitude of aircraft above the earth which includes transmitting a radio wave having a normal frequency from the craft, causing the frequency of said wave to vary cyclically with respect to said normal frequency dependently upon the phase relation existing between the wave which is transmitted from the craft and the wave which is reflected from the earth to the craft, changing the normal frequency of said wave, finding altitudes at which the frequency produced both before and after said change is the same, changing the altitude of the craft approximately a quarter of a wave length of one of the transmitted waves of normal frequency and again changing the normal frequency.

6. The method of measuring the altitude of an aircraft which includes transmitting a plurality of radio waves from the craft toward the earth, which are normally of different frequency, causing the reflected wave from the earth to modify the frequency of each of said waves and determining the altitude of the craft from the relation between the frequencies of said waves.

7. An altitude measuring device for aircraft comprising an antenna circuit arranged to oscillate normally at a frequency determined by the inherent constants of said circuit whereby the frequency of oscillations in said antenna varies cyclically with respect to the normal frequency as the aircraft changes in altitude, a movable element, means for causing said movable element to vary in position dependently upon variations in frequency of said oscillations produced by change in altitude of the craft, and means for preventing variations in said normal frequency more gradual that said variations produced by change in altitude of the craft from affecting the position of said movable element.

8. The combination in an altitude measuring device for aircraft, of means for transmitting a radio wave having a normal frequency from the craft, the frequency of said wave being cyclically variable with respect to said normal frequency dependently upon the phase relation existing between waves transmitted from the craft and waves which are reflected from the earth to the craft, means for producing an electromotive force which is variable in magnitude dependently upon said cyclic variations in frequency, indicating means responsive to said potential and means for preventing changes in the normal frequency of said wave more gradual than said cyclic variations from affecting said indicating means.

9. An altitude measuring device for aircraft, comprising an entenna circuit arranged to oscillate normally at a frequency determined by the inherent constants of the circuit whereby the frequency of oscillations in said antenna varies cyclically as the craft changes in altitude, a source of potential having a normal value, means for varying said potential cyclically dependently upon variations in frequency of oscillations on said antenna, indicating means responsive to said potential, a circuit connecting said source and said indicating means including a series-connected capacitance whereby frequencies of the order of magnitude of said cyclic variations are supplied to said indicating means while changes in potential of lower rate are excluded.

10. The combination in an altitude indicating device for aircraft, means for radiating oscillations of different frequencies from the craft toward the earth, each of said frequencies being dependent upon the phase relation between the radiated wave and the reflected wave which arrives back at the craft, and means for comparing the frequencies of said oscillations thereby to determine the altitude.

11. In a system for determining altitudes from aircraft by radio waves generated in a self-excited oscillation generator having a certain frequency determining characteristic, the method which includes radiating said waves toward the earth, impressing said waves after reflection from the earth upon said oscillation generator whereby the frequency of said waves varies cyclically as the craft changes in altitude, altering said frequency determining characteristic and determining the altitude from the relation between the frequency of waves produced before and after said change.

12. In a system for determining altitudes from aircraft, by radio waves generated in a self excited-oscillation generator, the method which includes radiating said waves toward the earth, impressing the radiated wave after reflection from the earth upon said generator whereby the reflected wave controls a characteristic of the radiated wave and whereby the phase relation between the radiated and reflected waves varies cyclically as the craft changes in altitude, producing an indication in accordance with the phase relation existing between said reflected and radiated waves, changing the natural period of said self-excited oscillation generator and determining the altitude from the indications produced before and after said natural period is changed.

ERNST F. W. ALEXANDERSON.

CERTIFICATE OF CORRECTION.

Patent No. 1,969,537.

August 7, 1934.

ERNST F. W. ALEXANDERSON.

It is hereby certified that error appears in the printed specification of the above numbered patent requiring correction as follows: Page 5, line 59, after "minima" strike out the word "at" and insert the same before "certain" in same line; and that the said Letters Patent should be read with this correction therein that the same may conform to the record of the case in the Patent Office.

Signed and sealed this 11th day of September, A. D. 1934.

(Seal)

Leslie Frazer
Acting Commissioner of Patents.